United States Patent [19]

Alaburda

[11] 3,928,681
[45] Dec. 23, 1975

[54] MELT COATING WITH ALKALI METALS

[75] Inventor: Raymond Daniel Alaburda, Wilmington, Del.

[73] Assignee: E. I. Du Pont de Nemours & Co., Wilmington, Del.

[22] Filed: June 5, 1974

[21] Appl. No.: 476,535

[52] U.S. Cl. ............... 427/431; 427/436; 427/398; 427/289
[51] Int. Cl.² .......................................... C23C 1/00
[58] Field of Search ........ 117/114 R, 114 A, 114 C, 117/50, 71; 427/436, 431, 398, 289

[56] References Cited
UNITED STATES PATENTS
3,551,184  12/1970  Dremann ............................ 117/50

*Primary Examiner*—Mayer Weinblatt
*Assistant Examiner*—Edith R. Buffalow

[57] ABSTRACT

Sheet metal substrates are coated with alkali metal by rubbing the sheet metal against a fixed bar while immersed in alkali metal melt to wet the sheet metal with melt, and rapidly cooling the coated metal.

7 Claims, 1 Drawing Figure

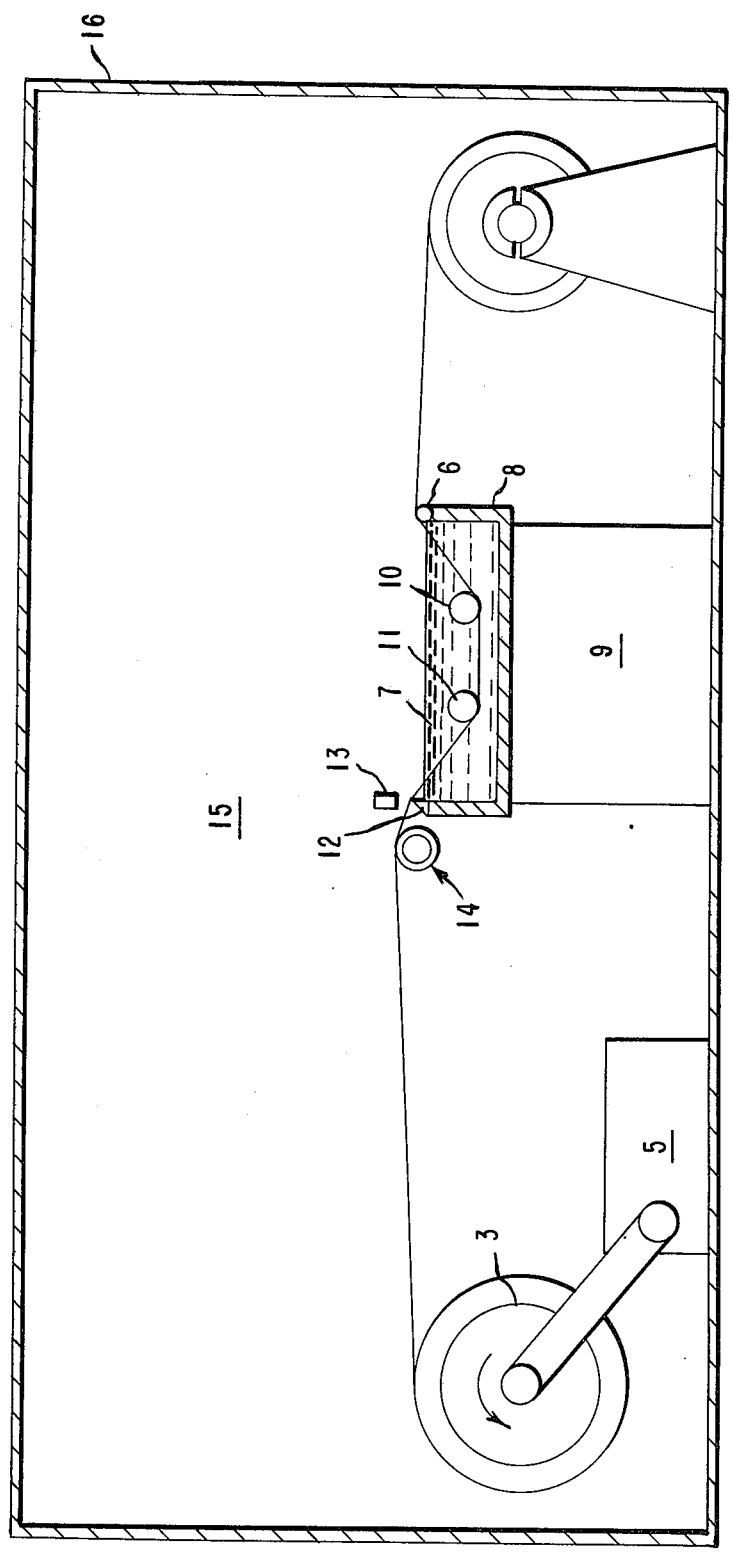

MELT COATING WITH ALKALI METALS

BACKGROUND OF THE INVENTION

High energy density primary cells have recently found expanded applications requiring compact cells. These include photographic applications where the cells are used to operate flash bulbs, film advance, and the like.

For such applications, the surface area of the active material should be large to provide for the high discharge rate of the cells. At the same time, the active material should be thin to provide for maximum compactness and economy as well as to minimize the possible fire hazard associated with discarded cells.

Lithium has been found to be particularly satisfactory for a wide variety of primary high energy density cells. Previous attempts to provide a lithium electrode by applying lithium onto a metal substrate have resulted in the preparation of electrodes having a thin lithium coating. However, a continuing need exists for the preparation of electrodes for use in high energy density cells having a continuous thickness of from 0.5–1.5 mil.

SUMMARY OF THE INVENTION

The present invention provides a process for coating the surface of a metal sheet with an alkali metal which comprises A. passing the metal sheet having a first and second surface into a bath of molten alkali metal, B. rubbing the immersed metal sheet with at least one bar of a metal inert to the alkali metal and at least about as hard as the metal sheet, to wet at least the first surface of the sheet with the molten alkali metal, C. withdrawing the metal sheet from the bath bearing a film of molten alkali metal, and D. cooling the metal sheet to solidify molten alkali metal film thereon within about three seconds after removal from the bath.

BRIEF DESCRIPTION OF THE DRAWING

The FIGURE is a schematic representation of an apparatus which can be used in the process of the instant invention.

DETAILED DESCRIPTION OF THE INVENTION

The present invention is based on the discovery that wetting of a sheet metal substrate by molten alkali metal can be achieved by rubbing the moving metal sheet to be coated against a bar while the surface is in contact with molten alkali metal. While the wetting operation is not fully understood, it is believed that the rubbing contact removes or interrupts the oxide film or reaction products of lithium with adsorbed gases, such as $N_2$ and $O_2$, on the surface of the metal. This esposes sufficient metal surface to allow complete wetting and adherent coating of the surface by molten alkali metal.

Metals which can typically be used as substrates in the present process, to be coated with alkali metals, are inert to the alkali metals under the conditions of process. Such metals include copper, chromium, molybdenum, cobalt, nickel, iron and alloys which contain at least 90% of these metals. Preferred among these metals are iron, carbon steel, nickel, austenitic stainless steels such as 302 stainless steel (18% Cr/9% Ni/bal. Fe), 304 stainless steel (19% Cr/10% Ni/bal. Fe) and 316 stainless steel (17% Cr/12% Ni/2–3% Mo/bal. Fe), Inconel 600 (76% Ni/16% Cr/8% Fe) and copper. Carbon steel and 302 stainless steel are especially preferred substrate metals. While the thickness of the substrate can vary depending on the required final strength, typically continuous carbon steel stock is used having a thickness of 1.5–2.0 mils.

Substrate metals should be free of dirt and organic materials to assure their adequate contact with molten alkali metal in this process. For this purpose, they can be washed with aqueous detergents, rinsed and dried before use. Another convenient method is to treat them with organic solvents to remove adherent organic materials. Other readily apparent cleaning methods can be used depending on the particular impurities to be removed.

In the present process it is generally desirable that the alkali metal used not react with the process environment. Accordingly, the process is carried out in a gas inert to the alkali metal, such as argon, helium or neon.

The clean metal substrate is passed into a bath of molten alkali metal. The preferred alkali metal for use in this process is lithium. However, other alkali metals, such as sodium (melting point 97.5°C.) and potassium (melting point 62.3°C.) can also be used.

Preferably the molten alkali metal is at a temperature elevated above its melting temperature. That elevation can be 10°–250°C., and preferably 70°–120°C., above the melting temperature.

While immersed in the molten alkali metal, the substrate is brought into rubbing contact with at least one metal surface at least about as hard as the metal sheet. Preferably the surface is harder than the substrate. The surface is generally in the form of a bar, and can be any shape which provides a rubbing surface against the sheet metal, such as round, oval or even knife-edged. Though in most cases it is fixed in the bath, it can be provided with a rolling movement counterdirectional to the moving substrate to accent its rubbing action.

The surface of the bar is generally a smooth, machined surface. The rubbing contact against the bar is adjusted to provide a complete wetting of the surface, which generally requires a minimum pressure of the substrate against the bar of about 0.5 pound per square inch of contact area. Preferably, for outstanding wetting of the substrate, a pressure of at least about 2.5 lb./in.$^2$ of substrate-bar contact area is obtained by appropriate adjustment of the tension on the substrate and the angle of contact with the bar. The maximum pressure is limited only by the strength of the substrate.

The term "wetting by the liquid alkali metal" as used herein means covering with that liquid so that it adheres over the entire substrate surface. Wetting by molten alkali requires that the substrate metal attain at least the melting temperature of the alkali metal used, and preferably this is attained before the rubbing action.

The required contacting time with the alkali metal after the sheet is rubbed will vary according to the alkali metal used. For example, with lithium the time will range 1–20, preferably 5–11, seconds at a temperature 70°–100°C. above its melting point. Longer times can be used with benefit to the process. The required contacting time will generally be longer at lower bath temperatures and shorter at higher bath temperatures.

Once coated with liquid alkali metal, the substrate metal is withdrawn from the melt. The thickness of the film of liquid metal depends on the viscosity of the film liquid, the withdrawal rate, the withdrawal elevation and the time before solidification, the viscosity depending on the nature of the alkali metal and its temperature, and, for coatings thinner than the substrate metal carrier, skimming action on the film after its drainage. The angle of elevation of the stubstrate from its withdrawal can be up to 90°. Lithium coatings can be controlled to be 0.2 to 20 mils, and preferably 0.5 to 1.5 mils, thick.

Cooling to solidify the liquid alkali film to a continuous adherent coating on the whole surface of the sheet metal is achieved in the case of one-side coating by contacting the underside of the sheet metal with a heat exchange means at a temperature low enough to solidify the coating film in three seconds or less after sheet metal bearing it has been withdrawn from the alkali metal melt. Preferably solidification should be effected in about from 0.1–1 seconds. The rapid solidification prevents interruption of the continous metal coating emerging from the molten bath. The coating means can conveniently be a cold surface over which the sheet metal slides or rolls, maintained at 25°–100°C. The cold surface can be the exterior of a fixed tube or roller cooled by an internal flow of cold gas or liquid. Without proper cooling a liquid lithium film on a carbon steel surface usually deteriorates within 5 seconds, often within 3 seconds, into a dispersion of liquid balls.

For anode use, it is often not desired to have alkali metal on more than one side of the sheet metal substrate. However, where desired, two-sided coating can be accomplished in accordance with the invention by carrying out the process so that both sides of the sheet metal are subjected to the rubbing action of a bar as defined and described herein.

Two-sided coatings can be cooled by passing the sheet metal bearing two films of liquid aklali metal through a chamber in heat exchange relation with a flow of cooled inert gas over the liquid films.

The present process can be carried out on the apparatus shown in the figure, in which substrate 1 is drawn from spool 2 to takeup spool 3 under tension controlled by braking means 4 on spool 2 against the driving force of controlled speed motor 5. Between these spools substrate 1 is drawn over roller 6, into pool 7 of molten lithium in container 8 controlled by heater 9 at a temperature of 250°–275°C., around and beneath round steel bars 10 and 11 fixed under the surface of pool 7. By the time substrate 1 reaches bars 10 and 11, it is normally heated up to at least 180.5°C., the melting point of lithium.

The rubbing of the substrate against the bars helps the top surface of the substrate to become wettable by the molten lithium during its continuous passage through the pool. The movement rate of substrate 1 is adapted to an immersion time of 5–11 seconds after it contacts bar 10.

Substrate 1 wetted and coated completely on its top side with a film of molten lithium is then withdrawn from pool 7, across a ½ to 1 inch gap and across scraper 12. If substrate 1 is tipped upward, as shown, its cover thickness of liquid lithium which reaches a cooling stage is steady in a range of 0.5–1.5 mils. Because substrate 1 rises at an angle as it emerges from pool 7, some lithium cover runs back into the bath. Its thickness can be controlled according to the temperature of pool 7, the angle at which substrate 1 emerges from pool 7, the rate of substrate movement and the distance and time between the emergence of the film and its solidification on the substrate 1.

Molten lithium scraped by scraper 12 runs back to pool 7, leaving little (about 0.2 mil) lithium on the bottom side as a discontinuous coating.

Advancing substrate 1 further drags it under blade 13 where molten lithium in excess of the desired thickness is skimmed off. After blade 13, the substrate slides over cooling tube 14, cooled by room temperature air or other suitable media flowing through it, which quickly solidfies the liquid lithium film.

Substrate 1, completely coated with solid lithium, is then collected on spool 3.

All steps of the described process are carried out under inert atmosphere 15, e.g., dry argon, maintained inside dry-box 16 which encloses the apparatus during process operation.

The invention, which is further illustrated by the following specific example, provides a convenient process for the preparation of metal substrates having a continuous alkali metal coating of as thin as 0.2 mil.

EXAMPLE

A 65 ft. long strip of 2 mil carbon steel 3 inches wide was scrubbed in 1,1,2-trichloro-1,2,2-trifluoromethane, rinsed with fresh solvent and dried with hot air.

Using equipment of the type shown in the Figure, the dry strip, wound on feed spool 2, was drawn in the path shown onto spool 3 under a dry argon atmosphere. Container 8 was 2 × 5 × 9 and contained molten lithium at a level such that the elevation of substrate 1 to scraper 12 was one-fourth inch and having a temperature of 250°C. Bars 10 and 11 were of one inch diameter steel, horizontally positioned 4 inches center-to-center from each other and submerged one inch from the top of the molten lithium. The strip was drawn through at 3 feet per minute. Scraper 12 was positioned to remove lithium melt from the lower side of the metal strip. Blade 13 was not used. The distance from the point of strip withdrawal from the melt to air-cooled tube 14 was 1⅝ inches.

The resulting coated strip had on one side an even silver-colored layer of lithium 1.5 mils thick. The other side was substantially clean.

The coated strip was cut into sections each of which was incorporated as an anode into a galvanic cell. The resulting cells provided high discharge rates in their use as electric flash bulb igniters.

I claim:
1. A process for coating the surface of a metal sheet with an alkali metal in an inert atmosphere which comprises
   A. passing the metal sheet presenting a surface to be coated into a bath of molten alkali metal,
   B. rubbing the immersed metal sheet with at least one bar of a metal inert to the alkali metal and at least about as hard as the metal sheet, to wet at least the surface to be coated with the molten alkali metal,
   C. withdrawing the metal sheet from the bath bearing a film of molten alkali metal, and
   D. cooling the metal sheet to solidify molten alkali metal film thereon within about three seconds after removal from the bath.

2. A process of claim 1 wherein the alkali metal is lithium.

3. A process of claim 2 wherein the lithium bath is maintained at a temperature of about from 250°–300°C.

4. A process of claim 1 wherein the sheet metal substrate material is selected from carbon steel and stainless steel consisting essentially of 18% chromium, 9% nickel and 73% iron.

5. A process of claim 4 wherein the bar is steel and has a substantially circular cross-section.

6. A process of claim 1 wherein the metal sheet is rubbed at a pressure of at least about 0.5 pound per square inch of substrate-bar contact area.

7. A process of claim 6 wherein the metal sheet is rubbed at a pressure of at least about 2.5 pounds per square inch of substrate-bar contact area.

* * * * *